(12) United States Patent
Nishiyama et al.

(10) Patent No.: US 12,581,022 B2
(45) Date of Patent: Mar. 17, 2026

(54) DATA CREATION METHOD AND DATA CREATION PROGRAM

(71) Applicant: FUJIFILM Corporation, Tokyo (JP)

(72) Inventors: Yukinori Nishiyama, Saitama (JP); Yuya Nishio, Saitama (JP); Tetsu Wada, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 770 days.

(21) Appl. No.: 17/668,256

(22) Filed: Feb. 9, 2022

(65) Prior Publication Data

US 2022/0270388 A1 Aug. 25, 2022

Related U.S. Application Data

(63) Continuation of application No. PCT/JP2020/029969, filed on Aug. 5, 2020.

(30) Foreign Application Priority Data

Aug. 15, 2019 (JP) .................................. 2019-149048

(51) Int. Cl.
*H04N 23/61* (2023.01)
*G06F 3/16* (2006.01)
(Continued)

(52) U.S. Cl.
CPC ......... *H04N 1/32128* (2013.01); *G06F 3/165* (2013.01); *H04N 23/61* (2023.01);
(Continued)

(58) Field of Classification Search
CPC ............... H04N 1/32128; H04N 23/61; H04N 2201/3264; H04N 23/60; H04N 5/77;
(Continued)

(56) References Cited

U.S. PATENT DOCUMENTS

| | | | | | |
|---|---|---|---|---|---|
| 8,913,103 | B1 * | 12/2014 | Sargin | .................... | G06V 40/16 |
| | | | | | 348/14.12 |
| 2012/0046101 | A1 * | 2/2012 | Marks | ..................... | A63F 13/00 |
| | | | | | 463/36 |
| 2015/0172840 | A1 | 6/2015 | Kitago et al. | | |

FOREIGN PATENT DOCUMENTS

| | | |
|---|---|---|
| JP | 2008-271082 A | 11/2008 |
| JP | 2012-151544 A | 8/2012 |
| | (Continued) | |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/029969, dated Feb. 24, 2022.
(Continued)

*Primary Examiner* — Mekonnen D Dagnew
(74) *Attorney, Agent, or Firm* — Birch, Stewart, Kolasch & Birch, LLP

(57) ABSTRACT

There is provided a data creation method for efficiently performing volume adjustment of a sound of each subject according to a state of each of a plurality of subjects. A data creation method includes: an association step (step S10 and step S11) of associating the microphone with each subject possessing each of the microphones; a recording step (step S12, step S20, and step S21) of recording moving image data using the imaging apparatus; a sound recording step (step S13) of recording sound data of each subject using each of the microphones in synchronization with a start of the recording step; a detection step (step S14 and step S15) of automatically detecting a state of the subject during the recording step; and an addition step (step S16 to step S19) of adding, to the moving image data, an identification code for volume adjustment of the sound data of each subject based on a result of the detection step.

20 Claims, 14 Drawing Sheets

(51) Int. Cl.
    *H04N 1/32*          (2006.01)
    *H04R 3/00*          (2006.01)
    *H04R 5/04*          (2006.01)
(52) U.S. Cl.
    CPC .............. *H04R 3/005* (2013.01); *H04R 5/04*
                    (2013.01); *H04N 2201/3264* (2013.01)
(58) Field of Classification Search
    CPC ........... H04N 5/92; H04N 5/76; H04N 23/66;
                H04N 23/50; G06F 3/165; H04R 3/005;
                    H04R 5/04; H04R 2430/01; H04R
                2499/11; H04R 1/08; H04R 3/00; H04S
                                2400/15; G10L 19/00
    See application file for complete search history.

(56)                References Cited

FOREIGN PATENT DOCUMENTS

JP        2013-158543 A    8/2013
JP         2015-73170 A    4/2015
JP        2015-119229 A    6/2015
JP        2019-103011 A    6/2019

OTHER PUBLICATIONS

International Search Report (Form PCT/ISA/210) for International
Application No. PCT/JP2020/029969, dated Oct. 27, 2020, with
English translation.

* cited by examiner

FIG. 5

MOVING
IMAGE DATA t1

FIRST SOUND DATA:
LARGE

130 t2

SECOND SOUND DATA:
LARGE

132 t3

FIRST SOUND DATA:
LARGE

134 t4

A

A

DATA CREATION METHOD AND DATA CREATION PROGRAM

CROSS-REFERENCE TO RELATED APPLICATIONS

The present application is a Continuation of PCT International Application No. PCT/JP2020/029969 filed on Aug. 5, 2020 claiming priority under 35 U.S.C § 119(a) to Japanese Patent Application No. 2019-149048 filed on Aug. 15, 2019. Each of the above applications is hereby expressly incorporated by reference, in its entirety, into the present application.

BACKGROUND OF THE INVENTION

1. Field of the Invention

The present invention relates to a data creation method and a data creation program.

2. Description of the Related Art

In the related art, there is a technique of collecting a sound by, for example, a microphone wirelessly connected to an imaging apparatus that images moving image data and obtaining sound data synchronized with the moving image data.

JP2015-73170A discloses a technique of storing a sound signal in a recording medium in a case where a wireless microphone connected to the imaging apparatus cannot transmit a sound signal to the imaging apparatus.

JP2015-119229A discloses a wireless communication apparatus that generates a recording file in association with log information related to communication between a microphone and the wireless communication apparatus.

SUMMARY OF THE INVENTION

According to an embodiment of a technique of the present disclosure, there is provided a data creation method for efficiently performing volume adjustment of a sound of each subject according to a state of each of a plurality of subjects.

According to an aspect of the present invention, there is provided a data creation method used in a camera system including an imaging apparatus and a plurality of microphones connected to the imaging apparatus, the method including: an association step of associating the microphone with each subject possessing each of the microphones; a recording step of recording moving image data using the imaging apparatus; a sound recording step of recording sound data of each subject using each of the microphones in synchronization with a start of the recording step; a detection step of automatically detecting a state of the subject during the recording step; and an addition step of adding, to the moving image data, an identification code for volume adjustment of the sound data of each subject based on a result of the detection step.

Preferably, in the detection step, a state where the subject is speaking in the moving image data is recognized by image processing, and in the addition step, the identification code for relatively increasing a volume of the sound data of the subject that is speaking with respect to a volume of the sound data of another subject is added to the moving image data.

Preferably, in the detection step, a direction in which each subject is facing in the moving image data is recognized by image processing, and in the addition step, the identification code for adjusting the volume of the sound data is added to the moving image data according to a direction of a face of each subject with respect to the imaging apparatus.

Preferably, in the detection step, a distance between each subject and the imaging apparatus in the moving image data is recognized by image processing, and in the addition step, the identification code for adjusting the volume of the sound data is added to the moving image data according to the distance of each subject.

Preferably, in the detection step, whether or not each subject exists within an angle of view of the imaging apparatus in the moving image data is recognized by image processing, and in the addition step, the identification code for adjusting the volume of the sound data is added to the moving image data according to whether or not the subject exists within the angle of view of the imaging apparatus.

Preferably, the data creation method further includes a position acquisition step of obtaining a position of each of a plurality of subjects from a position detection system that is possessed by each of the plurality of subjects. In the detection step, the position of each of the plurality of subjects that is obtained by the position acquisition step is detected, and in the addition step, the identification code for volume adjustment of the sound data of each subject is added to the moving image data based on a result of the detection step.

Preferably, the data creation method further includes a reception step of receiving volume adjustment of the sound data by a user after the addition step.

According to another aspect of the present invention, there is provided a data creation method used in a camera system including an imaging apparatus and a plurality of microphones connected to the imaging apparatus, the method including: an association step of associating the microphone with each subject possessing each of the microphones; a recording step of recording moving image data using the imaging apparatus; a sound recording step of recording sound data of each subject using each of the microphones in synchronization with a start of the recording step; a detection step of automatically detecting a state of the subject during the recording step; a synthesis step of synthesizing the sound data and the moving image data; and an adjustment step of automatically adjusting a volume of the sound data of each subject based on a result of the detection step, before or after the synthesis step.

Preferably, in the detection step, a state where the subject is speaking in the moving image data is recognized by image processing, and in the adjustment step, the volume of the sound data of the subject that is speaking is relatively increased with respect to a volume of the sound data of another subject.

Preferably, in the detection step, a direction in which each subject is facing in the moving image data is recognized by image processing, and in the adjustment step, the volume of the sound data is adjusted according to a direction of a face of each subject with respect to the imaging apparatus.

Preferably, in the detection step, a distance between each subject and the imaging apparatus in the moving image data is recognized by image processing, and in the adjustment step, the volume of the sound data is adjusted according to the distance of each subject.

Preferably, in the detection step, whether or not each subject exists within an angle of view of the imaging apparatus in the moving image data is recognized by image processing, and in the adjustment step, the volume of the sound data is adjusted according to whether or not the subject exists within the angle of view of the imaging apparatus.

Preferably, the data creation method further includes a position acquisition step of obtaining a position of each of a plurality of subjects from a position detection system that is possessed by each of the plurality of subjects. In the adjustment step, the volume of the sound data of each subject is adjusted based on a result of the position acquisition step and a result of the detection step.

According to still another aspect of the present invention, there is provided a data creation program used in a camera system including an imaging apparatus and a plurality of microphones connected to the imaging apparatus, the program causing a computer to execute: an association step of associating the microphone with each subject possessing each of the microphones; a recording step of recording moving image data using the imaging apparatus; a sound recording step of recording sound data of each subject using each of the microphones in synchronization with a start of the recording step; a detection step of automatically detecting a state of the subject from the moving image data during the recording step; and an addition step of adding, to the moving image data, an identification code for volume adjustment of the sound data of each subject based on a result of the detection step.

According to still another aspect of the present invention, there is provided a data creation program used in a camera system including an imaging apparatus and a plurality of microphones connected to the imaging apparatus, the program causing a computer to execute: an association step of associating the microphone with each subject possessing each of the microphones; a recording step of recording moving image data using the imaging apparatus; a sound recording step of recording sound data of each subject using each of the microphones in synchronization with a start of the recording step; a detection step of automatically detecting a state of the subject from the moving image data during the recording step; a synthesis step of synthesizing the sound data and the moving image data; and an adjustment step of automatically adjusting a volume of the sound data of each subject based on a result of the detection step, before or after the synthesis step.

BRIEF DESCRIPTION OF THE DRAWINGS

FIG. 5 is a diagram explaining an example of the moving image data to which an identification code is added.

DESCRIPTION OF THE PREFERRED EMBODIMENTS

Hereinafter, preferred embodiments of a data creation method and a data creation program according to the present invention will be described with reference to the accompanying drawings.

Figure 1:
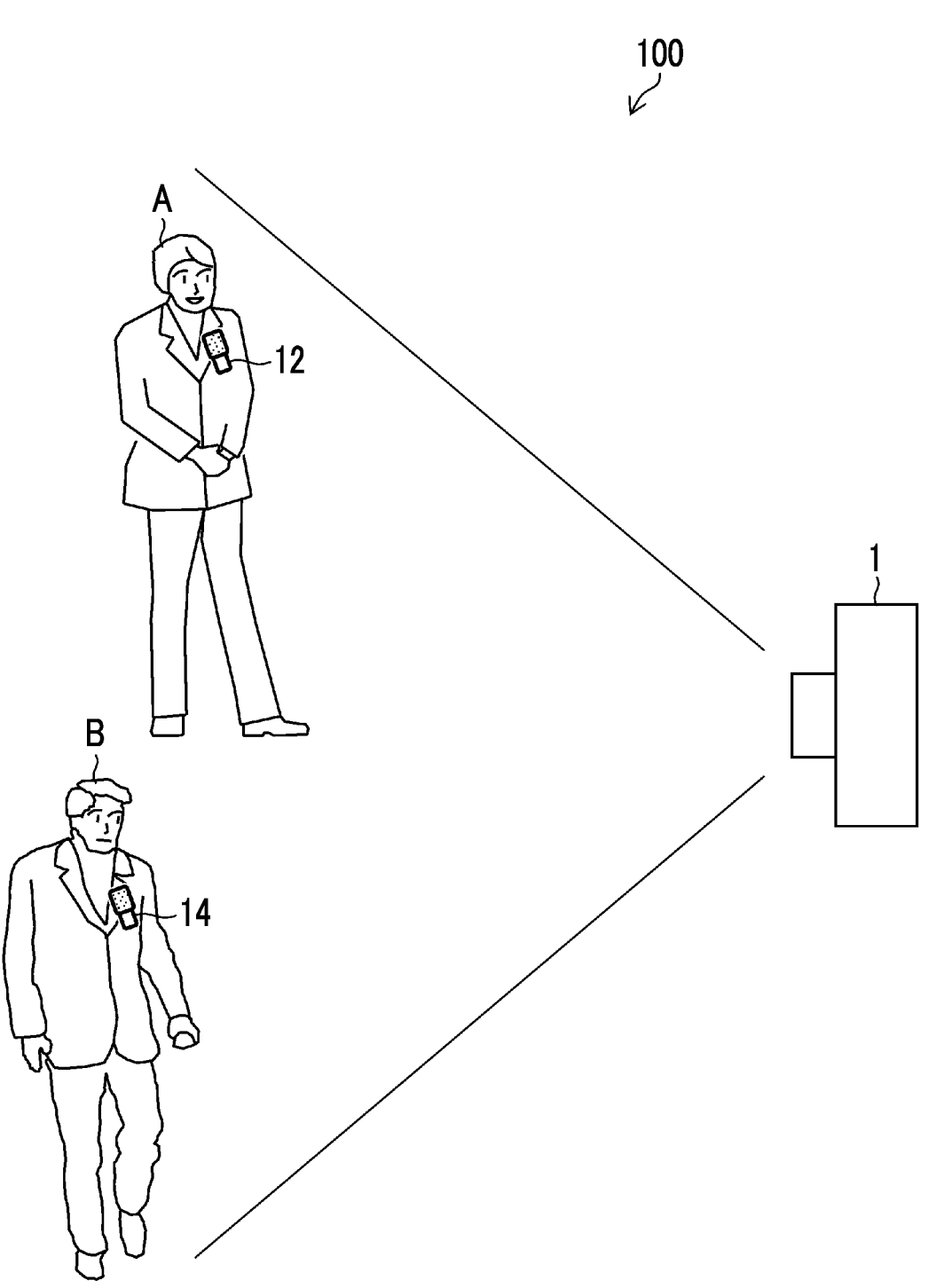
FIG. 1 is a diagram conceptually illustrating a camera system.

FIG. 1 is a diagram conceptually illustrating a camera system in which the data creation method according to the present invention is used.

An imaging apparatus 1 included in a camera system 100 acquires moving image data by imaging moving images of a person A and a person B. The person A possesses a first microphone 12, and the person B possesses a second microphone 14. The first microphone 12 and the second microphone 14 are wirelessly connected to the imaging apparatus 1.

In the following description, an example in which two microphones (the first microphone 12 and the second microphone 14) are used will be described. On the other hand, the number of microphones is not particularly limited, and the camera system 100 may include a plurality of microphones. Further, the first microphone 12 and the second microphone are wirelessly connected to the imaging apparatus 1, and may be connected to the imaging apparatus 1 by wire.

Figure 2:
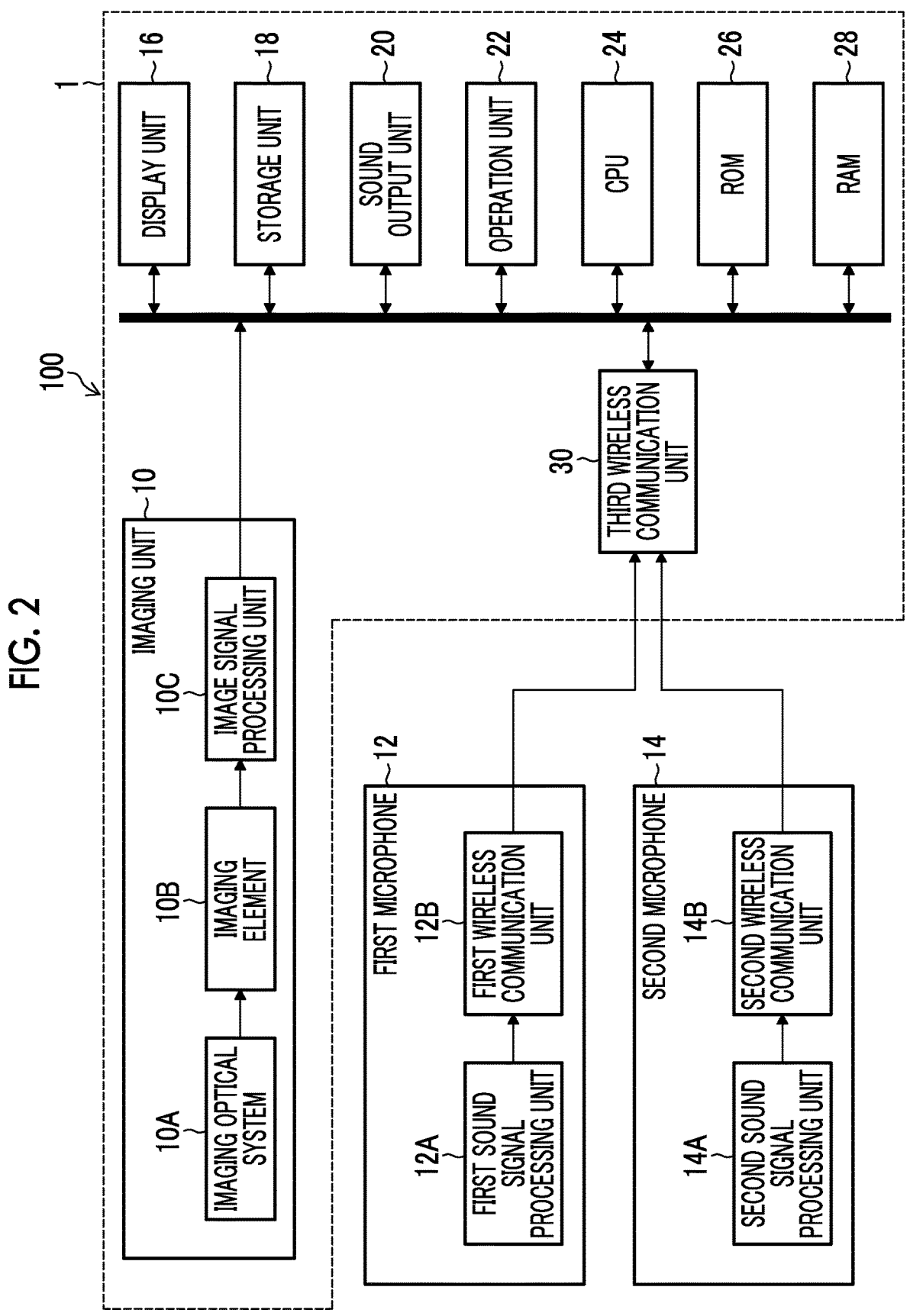
FIG. 2 is a block diagram illustrating a schematic configuration of the camera system.

FIG. 2 is a block diagram illustrating a schematic configuration of the camera system 100.

The camera system 100 includes the imaging apparatus 1, the first microphone 12, and the second microphone 14.

The imaging apparatus 1 includes an imaging unit 10, a display unit 16, a storage unit 18, a sound output unit 20, an operation unit 22, a central processing unit (CPU) 24, a read only memory (ROM) 26, a random access memory (RAM) 28, and a third wireless communication unit 30. Further, the first microphone 12 is wirelessly connected to the imaging apparatus 1 via a first wireless communication unit 12B and the third wireless communication unit 30, and the second microphone 14 is wirelessly connected to the imaging apparatus 1 via a second wireless communication unit 14B and the third wireless communication unit 30.

The imaging unit 10 acquires moving image data by imaging a moving image. The imaging unit 10 includes an imaging optical system 10A, an imaging element 10B, and an image signal processing unit 10C. The imaging optical system 10A forms an image of a subject on a light-receiving surface of the imaging element 10B. The imaging element 10B converts the image of the subject formed on the light-receiving surface into an electric signal by the imaging optical system 10A. The image signal processing unit 10C generates moving image data by performing predetermined signal processing on the signal which is output from the imaging element 10B.

The first microphone 12 collects a sound of the person A (first sound). The first microphone 12 includes a first sound signal processing unit 12A and a first wireless communication unit 12B. The first sound signal processing unit 12A generates first sound data of the first sound by performing predetermined signal processing on the signal from the microphone. The first wireless communication unit 12B converts the first sound data into a wireless signal according to a communication method defined in specifications of Bluetooth (registered trademark), performs processing required for wireless communication, and wirelessly outputs the signal to the imaging apparatus 1. The wireless communication method is not particularly limited to Bluetooth, and another method may also be adopted. For example, digital enhanced cordless telecommunication (DECT), wireless local area network (LAN), or Zigbee (registered trademark) may be adopted as a wireless communication method. Since the second microphone 14 has the same configuration as the first microphone 12, a description thereof will be omitted.

The display unit 16 displays a moving image corresponding to the moving image data acquired by the imaging unit 10 in real time. In addition, the display unit 16 displays a moving image to be reproduced. Further, the display unit 16 displays an operation screen, a menu screen, a message, and the like, as necessary. The display unit 16 includes, for example, a display device such as a liquid crystal display (LCD), and a drive circuit of the display device.

The storage unit 18 mainly records the acquired moving image data and the sound data. The storage unit 18 includes, for example, a storage medium such as a non-volatile memory, and a control circuit of the storage medium.

The sound output unit 20 outputs a sound reproduced based on the sound data. Further, the sound output unit 20 outputs a warning sound or the like as necessary. The sound output unit 20 includes a speaker, and a data processing circuit that processes sound data of a sound to be output from the speaker.

The operation unit 22 receives an operation input from a user. The operation unit 22 includes various operation buttons such as a recording button, buttons displayed on the display unit 16, and a detection circuit for an operation.

The CPU 24 functions as a control unit for the entire apparatus by executing a predetermined control program. The CPU 24 controls an operation of each unit based on an operation of the user, and collectively controls operations of the entire apparatus. The ROM 26 records various programs to be executed by the CPU 24, data required for control, and the like. The RAM 28 provides a work memory space for the CPU 24.

The third wireless communication unit 30 receives a wireless signal which is output from the first wireless communication unit 12B and the second wireless communication unit 14B, and performs processing on the received wireless signal based on Bluetooth specifications. The imaging apparatus 1 obtains first sound data and second sound data via the third wireless communication unit 30.

First Embodiment

A first embodiment according to the present invention will be described. In the present embodiment, an identification code for volume adjustment of the sound data is added to the moving image data according to a state of the subject automatically detected from the moving image data. Thereby, in the present embodiment, in editing work to be performed after the moving image data is acquired, the user can perform volume adjustment according to the identification code. Therefore, the user can save a trouble of checking the images one by one, and can efficiently perform volume adjustment of the sound data.

Figure 3:
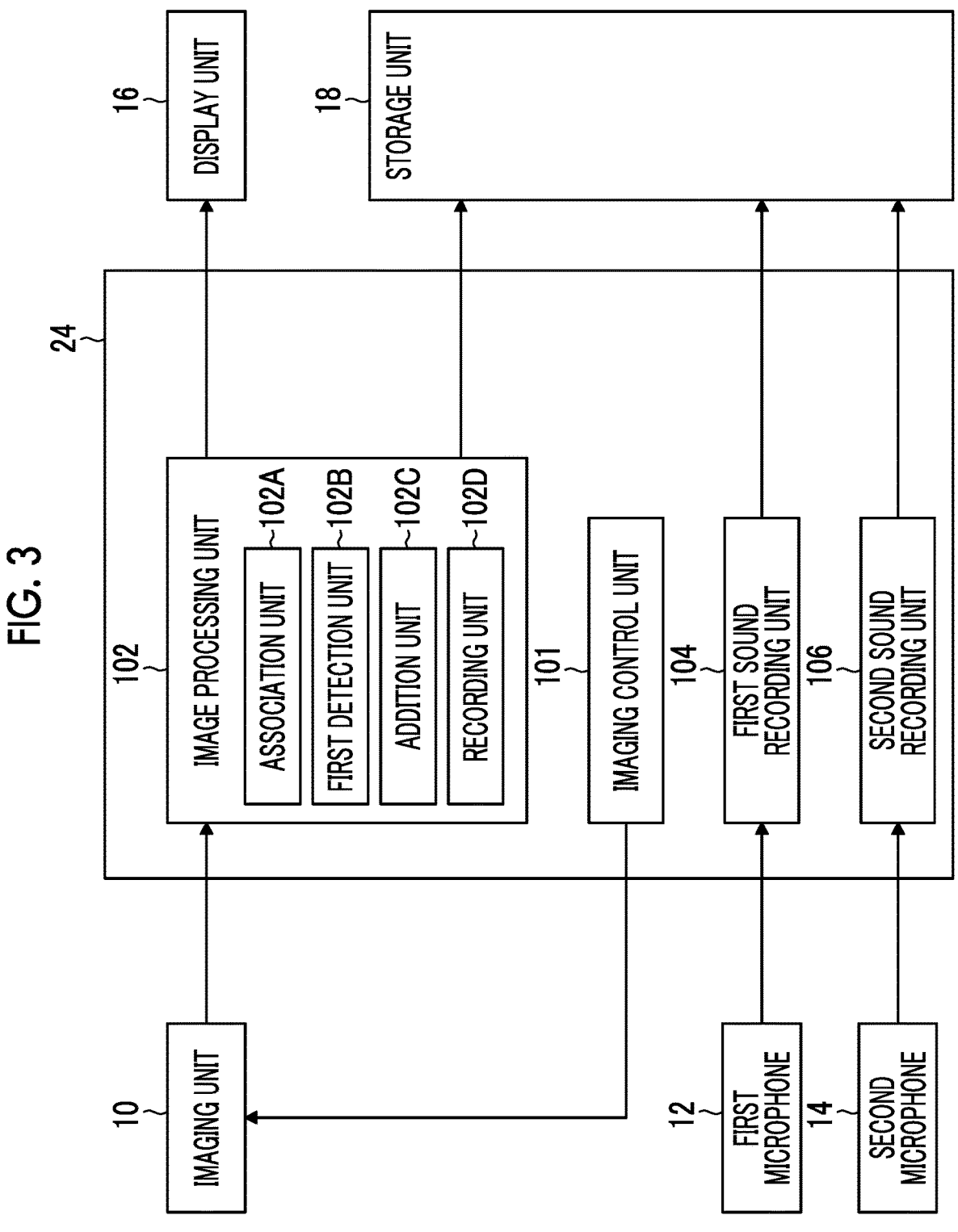
FIG. 3 is a block diagram explaining main functions realized by a CPU in a case of recording moving image data and sound data.

FIG. 3 is a block diagram explaining main functions realized by the CPU in a case of recording the moving image data and the sound data. As illustrated in FIG. 3, the CPU 24 functions as an imaging control unit 101, an image processing unit 102, a first sound recording unit 104, and a second sound recording unit 106.

The imaging control unit 101 controls imaging by the imaging unit 10. The imaging control unit 101 controls the imaging unit 10 based on the moving image obtained from the imaging unit 10 such that the moving image is imaged with an appropriate exposure. Further, the imaging control unit 101 controls the imaging unit 10 based on the moving image obtained from the imaging unit 10 such that the imaging unit 10 is focused on a main subject.

The image processing unit 102 outputs the moving image which is imaged by the imaging unit 10 to the display unit 16 in real time. Thereby, a live view is displayed on the display unit 16.

The image processing unit 102 includes an association unit 102A, a first detection unit 102B, an addition unit 102C, and a recording unit 102D.

The association unit 102A receives an association between the first microphone 12 and the person A and an association between the second microphone 14 and the person B. As a method of receiving an association, various methods may be adopted. For example, in a case of associating the first microphone 12, in a state where the person A is displayed on the display unit, 16, the user touches and selects the person A, and thus the first microphone 12 and the person A are associated. Here, the association means, for example, that the sound of the person A is set in advance to be collected via the first microphone 12.

The first detection unit 102B automatically detects a state of a subject while a moving image is being imaged by the imaging apparatus 1. In the first detection unit 102B, various techniques are applied such that a state of a subject can be recognized by image processing. For example, the first detection unit 102B recognizes a state of whether or not the person A and the person B are speaking by performing image processing on the moving image data using a face recognition technique.

The addition unit 102C adds, to the moving image data, an identification code for volume adjustment of the sound data of each subject, based on a result of a detection step. The added identification code is displayed when editing the moving image data, and thus the user can confirm the identification code.

The recording unit 102D records the moving image data which is output from the imaging unit 10 by recording the moving image data in the storage unit 18. The moving image data may be recorded with the identification code added by the addition unit 102C, or the moving image data before the identification code is added may be recorded in the storage unit 18. The recording unit 102D starts recording of the moving image data according to an instruction from the user. In addition, the recording unit 102D ends recording of the moving image data according to an instruction from the user. The user instructs starting and ending of recording via the operation unit 22.

The first sound recording unit 104 records the first sound data which is input from the first microphone 12 in the storage unit 18 in synchronization with the moving image data. The first sound data is recorded in the storage unit 18 in association with the moving image data.

The second sound recording unit 106 records the second sound data which is input from the second microphone 14 in the storage unit 18 in synchronization with the moving image data. The second sound data is recorded in the storage unit 18 in association with the moving image data.

Next, a specific example of acquiring the moving image data of each of the person A and the person B described with reference to FIG. 1 will be described.

Figure 4:
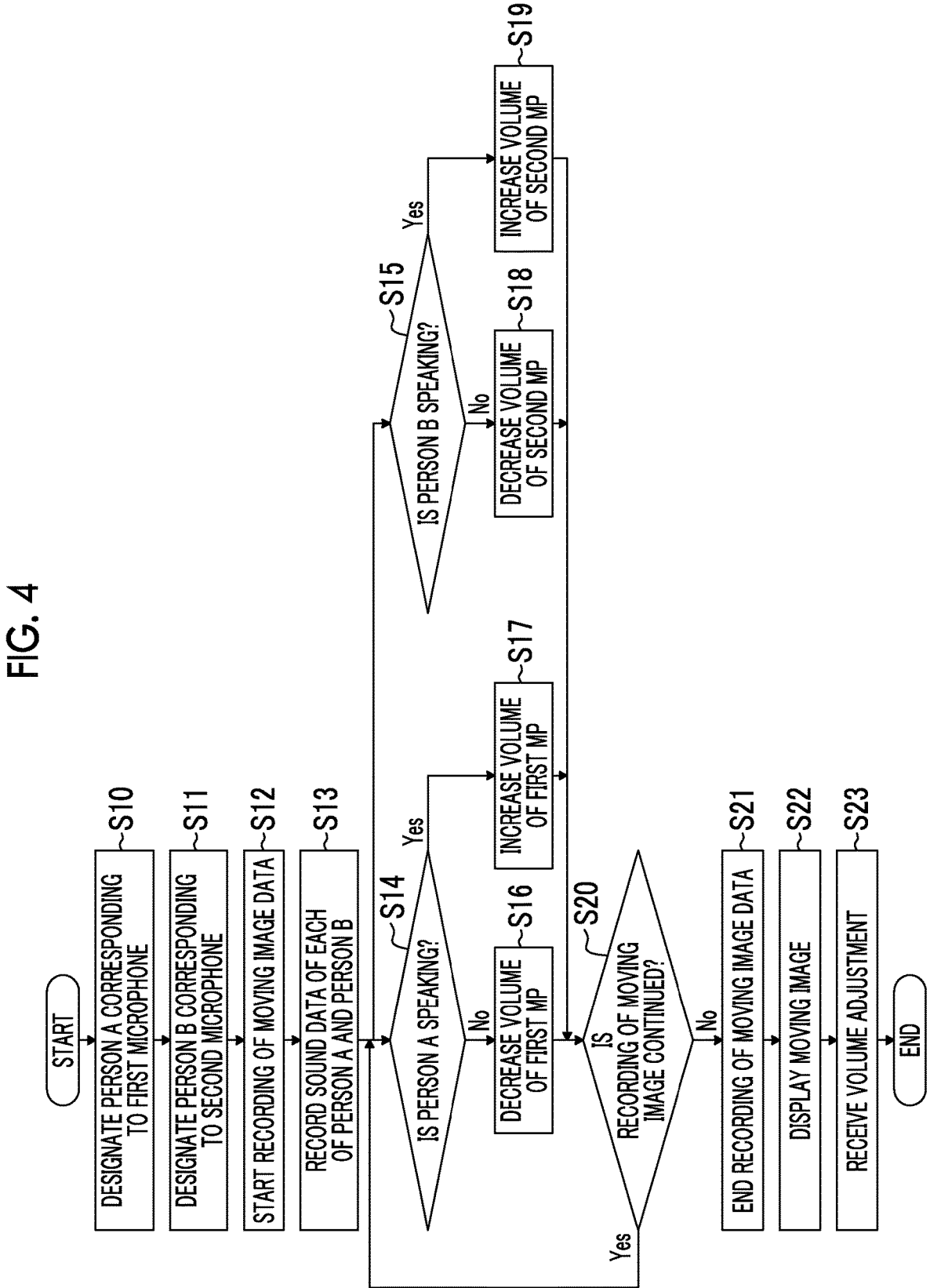
FIG. 4 is a flowchart explaining a data creation method.

FIG. 4 is a flowchart explaining a data creation method performed using the camera system 100.

[Association Step]

In an association step, the user touches and designates the person A displayed on the display unit 16 of the imaging apparatus 1, and thus the first microphone 12 and the person A are associated (step S10). Further, the user designates the person B displayed on the display unit 16 of the imaging apparatus 1, and thus the second microphone 14 and the person B are associated (step S11).

[Recording Step]

In a recording step, the user starts recording of the moving image data via the operation unit 22 (step S12). Thereafter, the imaging control unit 101 determines to continue recording of the moving image data (step S20), and performs moving image recording until an instruction to stop moving image recording is performed by the user via the operation unit 22. On the other hand, in a case where the user inputs an instruction to stop moving image recording via the operation unit 22, recording of the moving image data is ended (step S21). During the recording step, a sound recording step, a detection step, and an addition step to be described below are performed.

[Sound Recording Step]

In a sound recording step, the first sound data of the person A is recorded in the storage unit 18 using the first microphone 12, and the second sound data of the person B is recorded in the storage unit 18 using the second microphone 14 (step S13).

[Detection Step]

In a detection step, the first detection unit 102B detects that the person A is speaking (talking) in the moving image data by image processing (step S14). Further, in the detection step, the first detection unit 102B detects that the person B is speaking (talking) in the moving image data by image processing (step S15). For example, the first detection unit 102B recognizes faces of the person A and the person B by using a face recognition technique, and detects whether or not the person A and the person B are speaking by analyzing images of mouths of the person A and the person B.

[Addition Step]

In an addition step, in a case where the person A is not speaking, the addition unit 102C adds, to the moving image data, an identification code for relatively decreasing a volume of the first sound data (in FIG. 4, referred to as a first MP) collected by the first microphone 12 (step S16). On the other hand, in a case where the person A is speaking, the addition unit 102C adds, to the moving image data, an identification code for relatively increasing a volume of the first sound data collected by the first microphone 12 (step S17). Further, similarly, in a case where the person B is not speaking, the addition unit 102C adds, to the moving image data, an identification code for relatively decreasing a volume of the second sound data (in FIG. 4, referred to as a second MP) collected by the second microphone 14 (step S18), and in a case where the person B is speaking, the addition unit 102C adds, to the moving image data, an identification code for relatively increasing a volume of the second sound data collected by the second microphone 14 (step S19). In the following description, the moving image data to which the identification code is added will be described.

Figure 5:
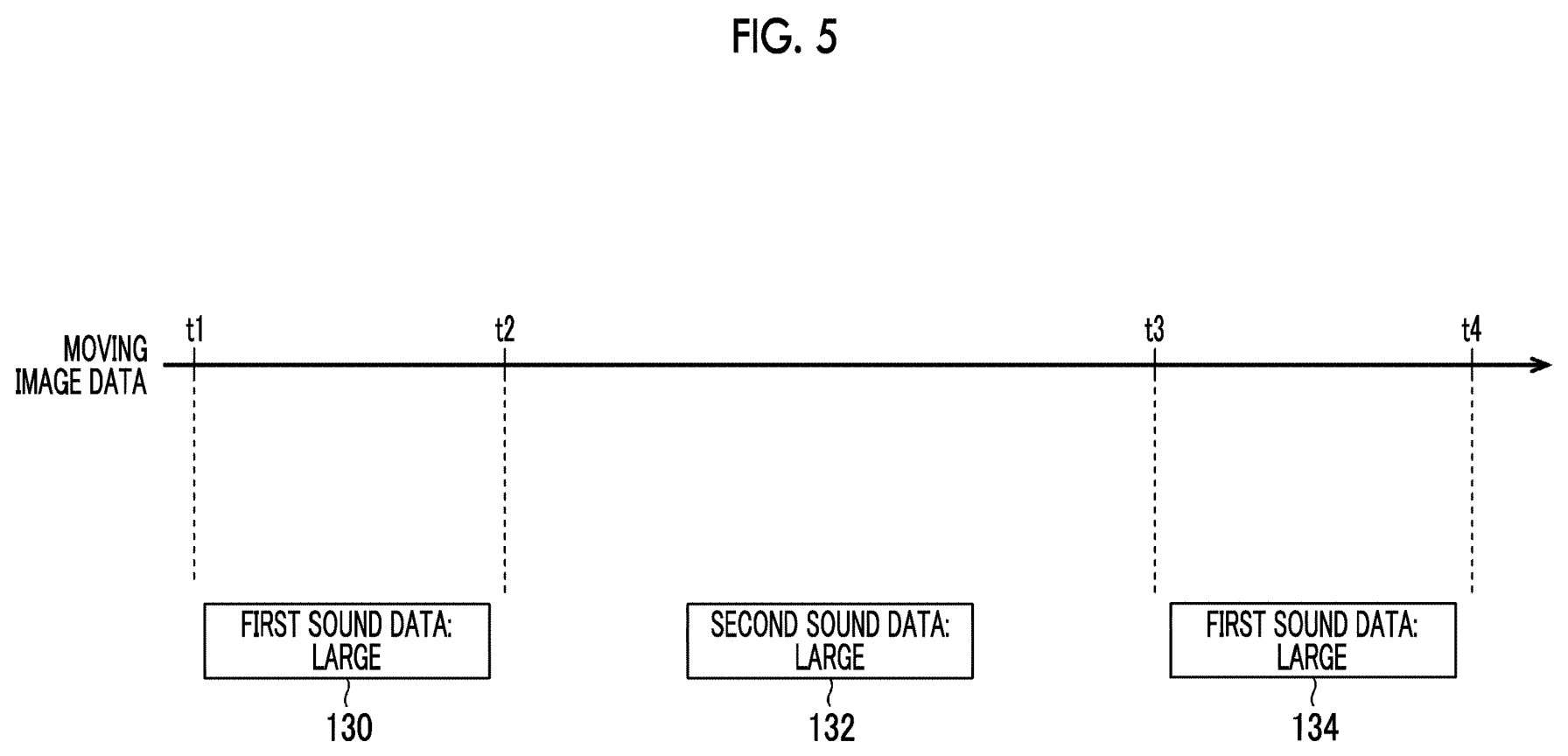

FIG. 5 is a diagram explaining an example of the moving image data to which the identification code is added.

The first detection unit 102B detects that the person A is speaking in the moving image data during a period from t1 to t2. The addition unit 102C adds, to the moving image data, the identification code "first microphone: large" (reference numeral 130) for increasing the volume of the first microphone 12 based on a detection result of the first detection unit 102B. Further, the first detection unit 102B detects that the person B is speaking in the moving image data during a period from t2 to t3. The addition unit 102C adds, to the moving image data, the identification code "second microphone: large" (reference numeral 132) for increasing the volume of the second microphone 14 based on a detection result of the first detection unit 102B. Further, the first detection unit 102B detects that the person A is speaking in the moving image data during a period from t3 to t4. The addition unit 102C adds, to the moving image data, the identification code "first microphone: large" (reference numeral 134) for increasing the volume of the first microphone 12 based on a detection result of the first detection unit 102B. Further, instead of "first microphone: large", in order to relatively increase the volume of the first microphone 12, the identification code "second microphone: small" may be added to the moving image. The identification code is not limited to the above-described identification code, and various forms may be adopted as long as the form represents volume adjustment of the first sound data and the second sound data. For example, as the identification code, "second sound data: small" for decreasing the volume of the second sound data may be added in accordance with "first microphone: large". Further, as the identification code, the identification code "first sound data: level 10" obtained by assigning the volume level of the first sound data may be added. As a numerical value of the volume level is larger, the volume is larger.

[Moving Image Display Step]

In a moving image display step, a moving image based on the recorded moving image data is displayed (step S22). The moving image based on the moving image data is displayed on a computer monitor provided separately from the imaging apparatus 1. For example, the user causes a moving image to be displayed on a monitor, and performs editing work on the moving image. The user causes the moving image to be displayed on the monitor, and adjusts the volume of the first sound data and the volume of the second sound data. In a case where the user causes a moving image based on moving image data to be displayed on the display unit 16 of the imaging apparatus 1 and performs editing work on the moving image, the user may cause the moving image to be displayed on the display unit 16 and may perform editing on the moving image.

[Volume Adjustment Reception Step]

In a volume adjustment reception step, volume adjustment of the sound data by the user is received (step S23). Specifically, the user performs volume adjustment of the first sound data and/or the second sound data while confirming the moving image data displayed on the monitor and the identification code added to the moving image data. For example, in a case where the user confirms the moving image data to which the identification code illustrated in FIG. 5 is added, during the period from t1 to t2, the user relatively increases the volume of the first sound data by setting the volume level of the first sound data to 10 and setting the volume level of the second sound data to 1. In addition, during the period from t2 to t3, the user relatively increases the volume of the second sound data by setting the volume level of the second sound data to 10 and setting the volume level of the first sound data to 1. Further, during the period from t3 to t4, the user relatively increases the volume of the first sound data by setting the volume level of the first sound data to 10 and setting the volume level of the second sound data to 1.

As described above, in the data creation method according to the present embodiment, whether or not the person A and the person B are speaking in the moving image data is automatically detected by image processing, and the identification code for volume adjustment is added to the moving image data according to the detection result. Thereby, the user can adjust the volume of the first sound data and the volume of the second sound data by confirming the identification code when performing editing of the moving image data. Thus, the user can save a trouble of confirming the image again, and can efficiently perform volume adjustment according to a state of the person A and a state of the person B.

In the embodiment, a hardware structure of the processing unit (the image processing unit 102, the imaging control unit 101, the first sound recording unit 104, the second sound recording unit 106) that executes various processing is realized by the following various processors. The various processors include a central processing unit (CPU) which is a general-purpose processor that functions as various processing units by executing software (program), a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors having the same type or different types (for example, a combination of a plurality of FPGAs or a combination of a CPU and an FPGA). Further, the plurality of processing units may be configured by one processor. As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

Each of the configurations and the functions may be appropriately realized by hardware, software, or a combination of hardware and software. For example, for a program that causes a computer to execute the processing steps (processing procedures), a computer-readable recording medium (non-transitory recording medium) in which the program is recorded, or a computer on which the program may be installed, the present invention may be applied.

Second Embodiment

Next, a second embodiment according to the present invention will be described. In the present embodiment, volume adjustment is performed on the sound data to be combined with the moving image data according to a state of the subject automatically detected from the moving image data. Thereby, in the present embodiment, it is possible to efficiently obtain the moving image data with the sound of which the volume is adjusted according to the state of the subject.

Figure 6:
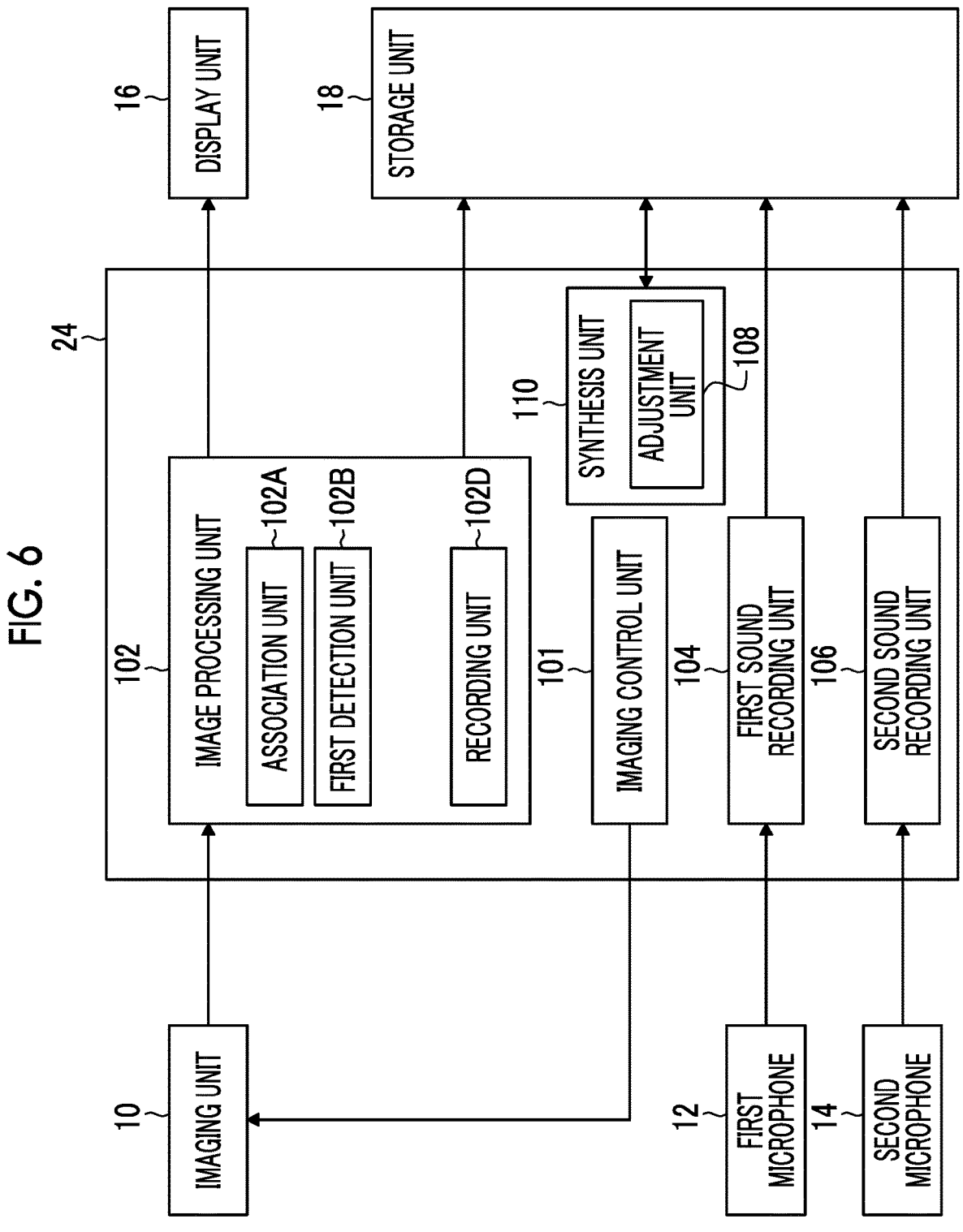
FIG. 6 is a block diagram explaining main functions realized by a CPU in a case of recording the moving image data and the sound data.

FIG. 6 is a block diagram explaining main functions realized by the CPU in a case of recording the moving image data and the sound data. The components described in FIG. 3 are denoted by the same reference numerals, and a description thereof will be omitted.

As illustrated in FIG. 6, the CPU 24 functions as an imaging control unit 101, an image processing unit 102, a first sound recording unit 104, a second sound recording unit 106, an adjustment unit 108, and a synthesis unit 110. The image processing unit 102 according to the present embodiment includes an association unit 102A, a first detection unit 102B, and a recording unit 102D.

The adjustment unit 108 automatically adjusts a volume of the first sound data recorded in the storage unit 18 and a volume of the second sound data recorded in the storage unit 18, based on a detection result of the first detection unit 102B. The adjustment unit 108 adjusts the volume of the sound data to a preset volume according to a state of the subject detected by the first detection unit 102B, based on a detection result of the first detection unit 102B. The adjustment unit 108 may adjust the volume of the sound data before being synthesized by the synthesis unit 110, or may adjust the volume of the sound data after being synthesized by the synthesis unit 110.

The synthesis unit 110 generates the moving image data with sound by synthesizing the moving image data and the sound data that are recorded in the storage unit 18. The synthesis unit 110 generates one moving image file by synthesizing the moving image data and the sound data in synchronization with each other. The file generated by the synthesis unit 110 has a moving image file format. For example, a file having an AVI format, an MP4 format, or an MOV format is generated.

Figure 7:
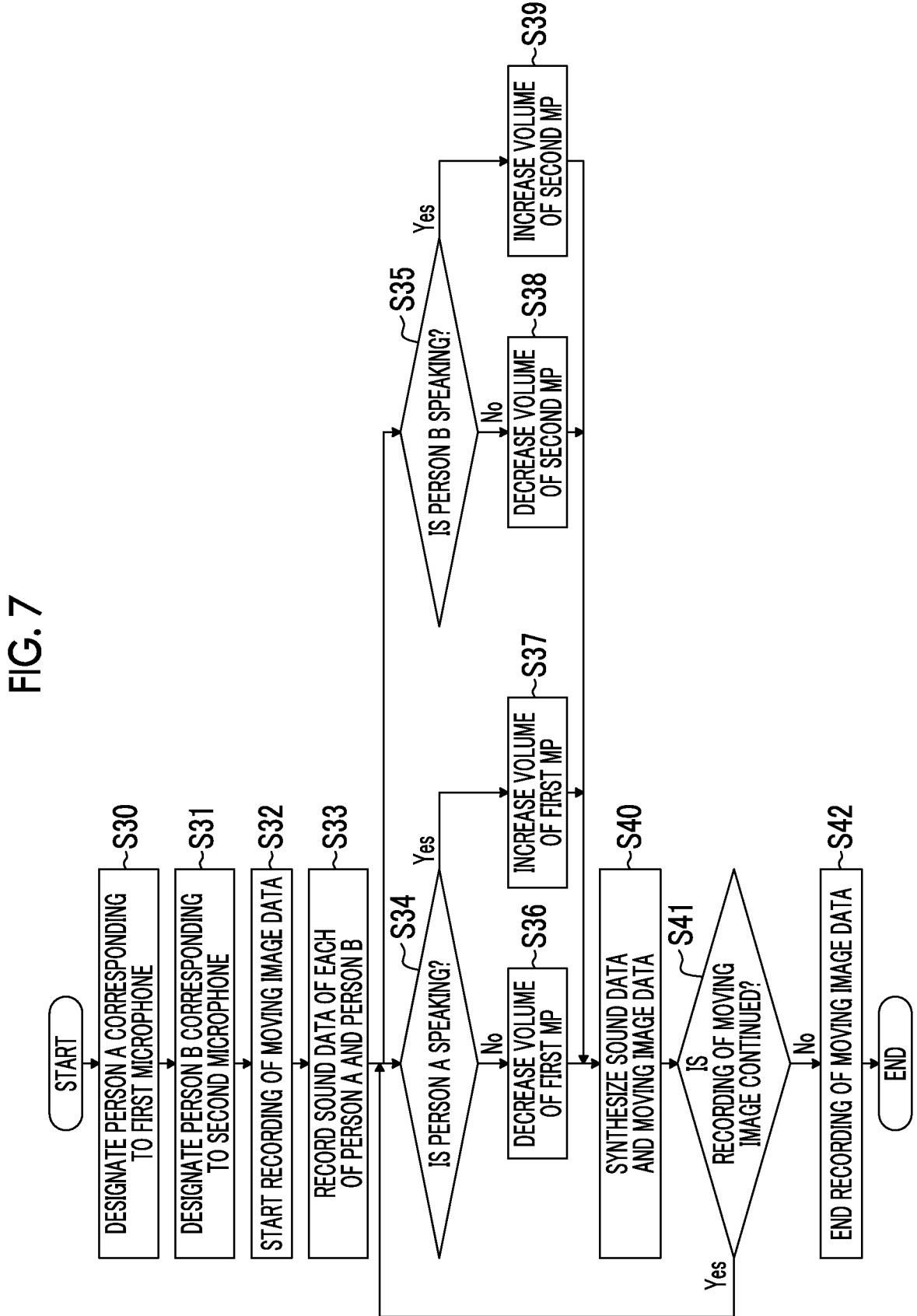
FIG. 7 is a flowchart explaining a data creation method.

FIG. 7 is a flowchart explaining a data creation method performed using the camera system 100. In the following description, a specific example of acquiring the moving image data of each of the person A and the person B described with reference to FIG. 1 will be described. The association step, the recording step, the sound recording step, and the detection step described in FIG. 4 have the same contents, and thus a description thereof is simplified.

[Association Step]

In an association step, the first microphone 12 and the person A are associated, and the second microphone 14 and the person B are associated (steps S30 and S31).

[Recording Step]

In a recording step, recording of the moving image data is performed, and the recording of the moving image data is ended based on an instruction of the user (step S32, step S41, and step S42).

[Sound Recording Step]

In a sound recording step, the first sound data and the second sound data are recorded in the storage unit 18 (step S33).

[Detection Step]

In a detection step, whether or not the person A is speaking in the moving image data is detected (step S34). Further, in the detection step, whether or not the person B is speaking in the moving image data is detected (step S35).

[Adjustment Step]

In an adjustment step, the adjustment unit 108 decreases the volume of the first sound data in a case where the person A is not speaking (step S36), and increases the volume of the first sound data in a case where the person A is speaking (step S37). Further, similarly, the adjustment unit 108 decreases the volume of the second sound data in a case where the person B is not speaking (step S38), and increases the volume of the second sound data in a case where the person B is speaking (step S39). In the following description, the automatic adjustment of the volume of the sound data will be specifically described.

Figure 8:
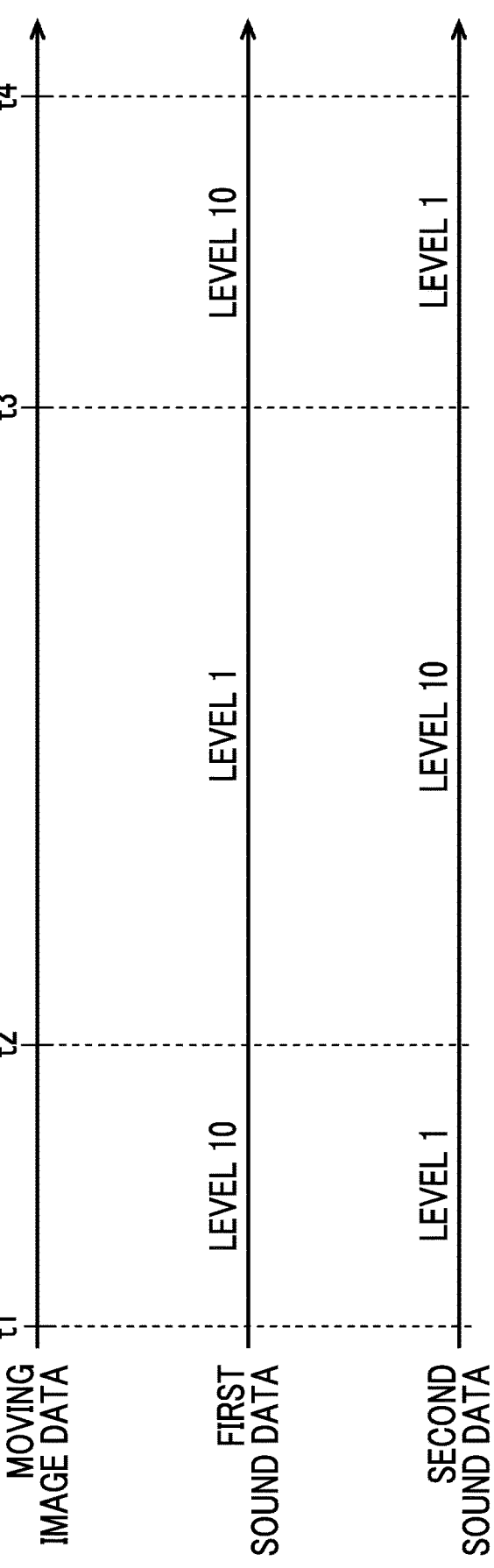
FIG. 8 is a diagram explaining volume adjustment of first sound data and second sound data.

FIG. 8 is a diagram explaining volume adjustment of the first sound data and the second sound data.

In the moving image data, during the period from t1 to t2, the person A is speaking. Thus, the adjustment unit 108 adjusts the volume of the first sound data to level 10. On the other hand, in the moving image data, during the period from t1 to t2, the person B is not speaking. Thus, the adjustment unit 108 adjusts the volume of the second sound data to level 1. Further, in the moving image data, during the period from t2 to t3, the person A is not speaking. Thus, the adjustment unit 108 adjusts the volume of the first sound data to level 1. On the other hand, in the moving image data, during the period from t2 to t3, the person B is speaking. Thus, the adjustment unit 108 adjusts the volume of the second sound data to level 10. Further, in the moving image data, during the period from t3 to t4, the person A is speaking. Thus, the adjustment unit 108 adjusts the volume of the first sound data to level 10. On the other hand, in the moving image data, during the period from t3 to t4, the person B is not speaking. Thus, the adjustment unit 108 adjusts the volume of the second sound data to level 1. In the above description, volume adjustment of the first sound data and the second sound data recorded in the storage unit 18 is described. On the other hand, the present embodiment is not limited to the example. For example, the volume of the first sound data and the volume of the second sound data may be adjusted before being recorded in the storage unit 18. In this case, the adjustment unit 108 may be provided in the first sound recording unit 104 and the second sound recording unit 106.

[Synthesis Step]

In a synthesis step, the synthesis unit 110 synthesizes the first sound data and the second sound data of which the volume is adjusted and the moving image data (step S40). For example, the synthesis unit 110 generates a moving image file with an AVI format by synthesizing the first sound data and the second sound data of which the volume is adjusted and the moving image data.

As described above, in the data creation method according to the present embodiment, whether or not the person A and the person B are speaking in the moving image data is automatically detected, and the volume of the sound data is adjusted according to the detection result. Thereby, the user can efficiently acquire the moving image data with sound obtained by adjusting the volume of the first sound data and the volume of the second sound data according to the state of the subject in the moving image data, without manually performing volume adjustment.

Next, modification examples according to the present invention will be described. In the above description, an example of performing volume adjustment according to whether or not the subjects (person A and person B) are speaking has been described. On the other hand, application of the present invention is not limited to the example. In the following description, as a modification example, an example of performing volume adjustment according to various states of the subjects will be described. A modification example to be described may be applied to an embodiment (first embodiment) in which the identification code is added to the moving image data and an embodiment (second embodiment) in which the volume of the sound data is adjusted.

Modification Example 1

A modification example 1 will be described. In the present example, each of the subjects possess a position detection system, and a position of each subject is detected from the position detection system. An identification code for adjusting the volume of the sound data is added based on the detected position of each subject, or the volume of the sound data is adjusted.

Figure 9:
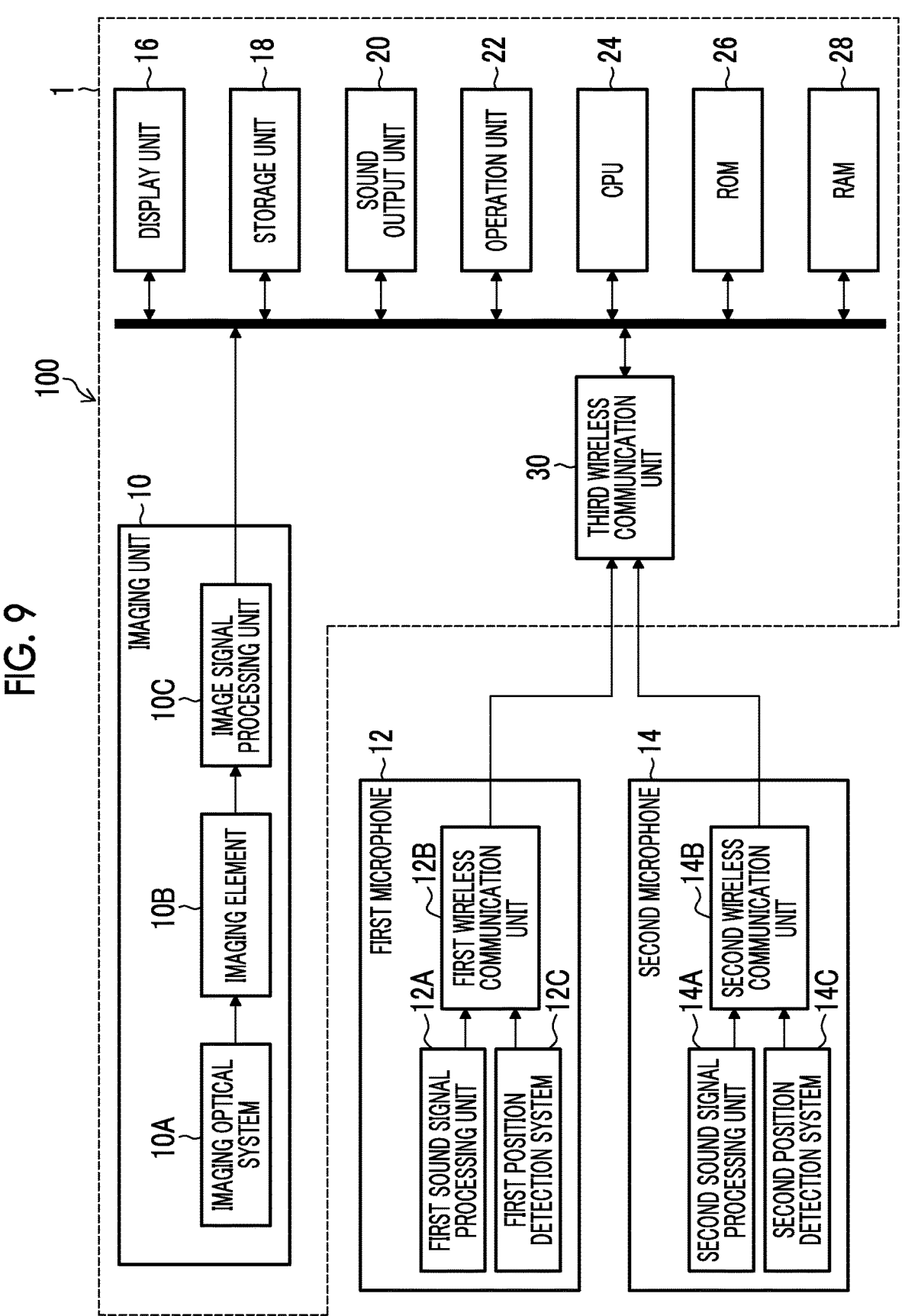
FIG. 9 is a block diagram illustrating a schematic configuration of the camera system.

FIG. 9 is a block diagram illustrating a schematic configuration of the camera system 100. The components described in FIG. 2 are denoted by the same reference numerals, and a description thereof will be omitted.

The first microphone 12 includes a first sound signal processing unit 12A, a first wireless communication unit 12B, and a first position detection system 12C. The first position detection system 12C detects a position of the first microphone 12. For example, the first position detection system 12C detects the position of the first microphone 12 by a global positioning system (GPS). Since the person A possesses the first microphone 12, the first position detection system 12C detects a position of the person A. The position of the person A detected by the first position detection system 12C is input to the imaging apparatus 1 via the first wireless communication unit 12B and the third wireless communication unit 30. Since the second microphone 14 has the same configuration as the first microphone 12, a description thereof will be omitted.

Figure 10:
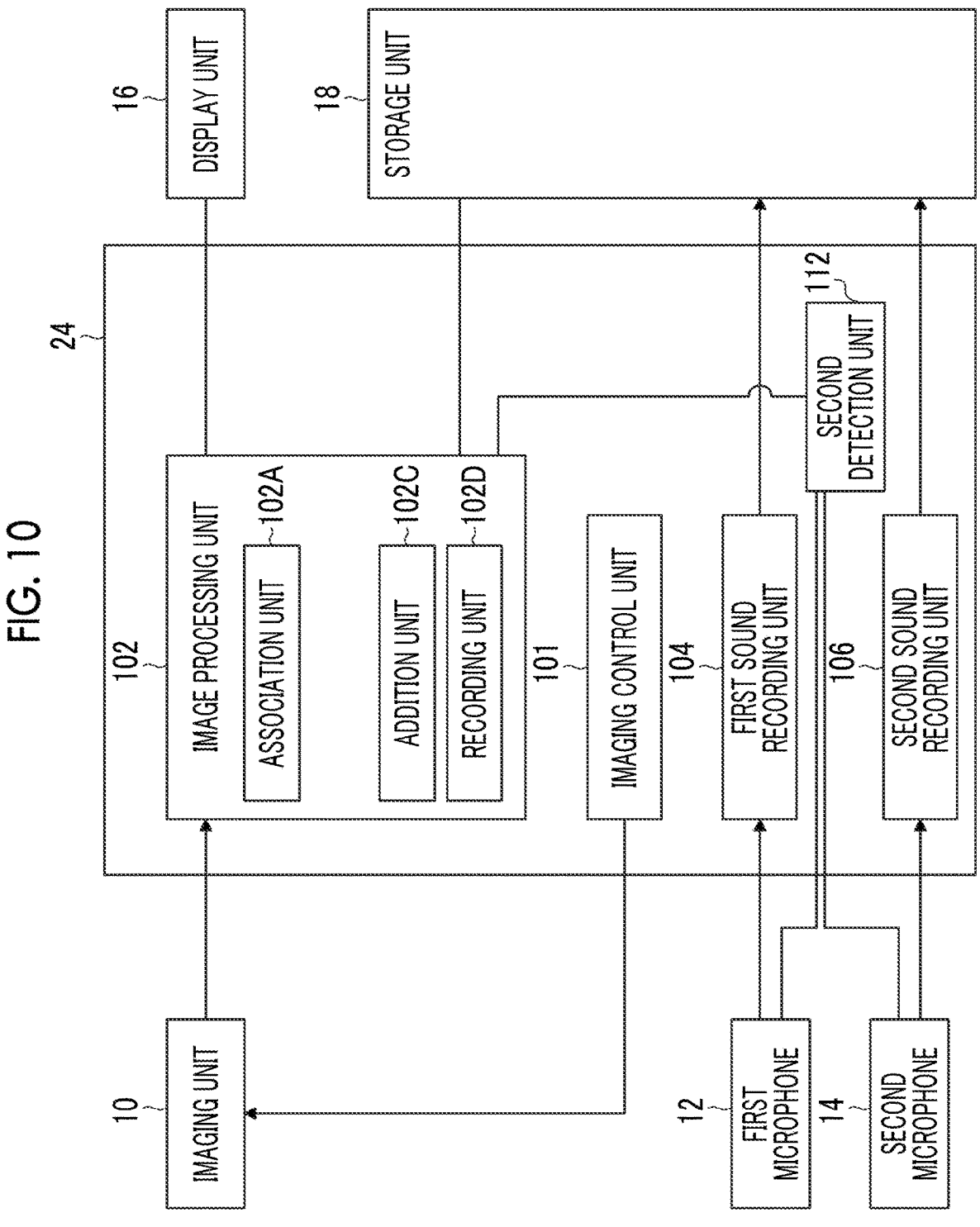
FIG. 10 is a block diagram explaining main functions realized by a CPU in a case of recording the moving image data and the sound data.

FIG. 10 is a block diagram explaining main functions realized by the CPU 24 in a case of recording the moving image data and the sound data. The components described in FIG. 3 are denoted by the same reference numerals, and a description thereof will be omitted.

As illustrated in FIG. 10, the CPU 24 functions as an imaging control unit 101, an image processing unit 102, a first sound recording unit 104, a second sound recording unit 106, and a second detection unit 112.

The second detection unit 112 obtains information on the position of the person A from the first microphone 12 and information on the position of the person B from the second microphone 14. Specifically, the second detection unit 112 acquires information on the position of the person A detected by the first position detection system 12C of the first microphone 12 and information on the position of the person B detected by the second position detection system 14C of the second microphone 14. The second detection unit 112 detects a distance between the person A and the imaging apparatus 1 and a distance between the person B and the imaging apparatus 1.

The addition unit 102C adds, to the moving image data, an identification code for volume adjustment of the sound data of each subject, based on a detection result of the second detection unit 112. For example, the addition unit 102C adds an identification code for volume adjustment of the first sound data according to the distance of the person A from the imaging apparatus 1, and adds an identification code for volume adjustment of the second sound data according to the distance of the person B from the imaging apparatus 1. For example, in a case where the person A is farther than a distance a from the imaging apparatus 1, the addition unit 102C adds an identification code for decreasing the volume. Further, in a case where the person A is within a distance 13 from the imaging apparatus 1, the addition unit 102C adds an identification code for increasing the volume. Further, for example, for volume adjustment of the sound data, as the distance between the person A (or the person B) and the imaging apparatus 1 is increased, the volume of the first microphone 12 or the volume of the second microphone 14 may be gradually decreased.

As described above, in the present example, the position detection system acquires information on the position of the person A and information on the position of the person B, and the second detection unit 112 accurately detects the position of the person A and the position of the person B based on pieces of the information on the positions. Thus, volume adjustment can be efficiently performed based on the positions of the person A and the person B.

Modification Example 2

Next, a modification example 2 will be described. In the modification example 2, an identification code is added or volume adjustment of the sound data is performed according to a direction in which the subject is facing.

In the present example, the first detection unit 102B recognizes a direction in which each subject is facing in the moving image data by image processing. For example, the first detection unit 102B recognizes directions in which the person A and the person B are facing by a face recognition technique. The identification code is added or the volume of the sound data is adjusted according to the directions in which the person A and the person B are facing. For example, in volume adjustment of the sound data, in a case where the person A is facing a direction (a front surface) of the imaging apparatus 1, the volume of the first sound data is increased, and in a case where the person A is not facing a direction of the imaging apparatus 1, the volume of the first sound data is decreased.

Figure 11A:
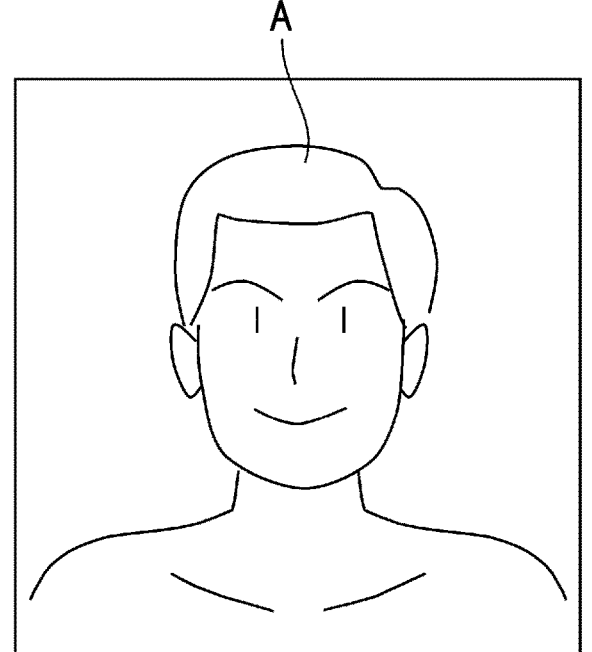
FIGS. 11A and 11B are diagrams explaining a specific example.
Figure 11B:
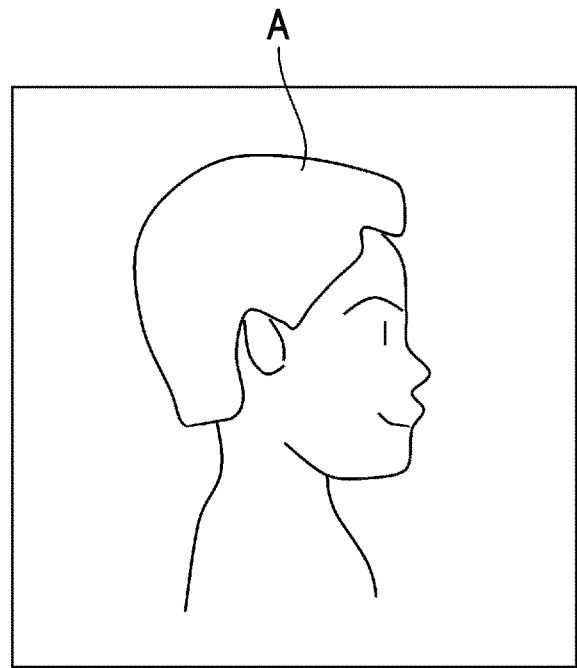

FIGS. 11A and 11B are diagrams explaining a specific example of the present example.

In a case illustrated in FIG. 11A, the person A is facing a front surface of the imaging apparatus 1. In this case, the first detection unit 102B detects that the person A is facing the front surface, and volume adjustment for increasing the volume of the first sound data as the sound data of the person A is performed. On the other hand, in a case illustrated in FIG. 11B, the person A is facing a side surface of the imaging apparatus 1 (is not facing a front surface). In this case, the first detection unit 102B detects that the person A is facing the side surface, and volume adjustment for decreasing the volume of the first sound data as the sound data of the person A is performed.

As described above, in the present example, the first detection unit 102B detects a direction in which the subject is facing, and volume adjustment is efficiently performed based on the direction in which the subject is facing.

Modification Example 3

Next, a modification example 3 will be described. In the modification example 3, an identification code for volume adjustment of the sound data is added or volume adjustment of the sound data is performed according to a distance of the subject.

In the present example, the first detection unit 102B recognizes a distance between each subject and the imaging apparatus 1 in the moving image data by image processing.

For example, the first detection unit 102B detects a distance of the person A and a distance of the person B from the imaging apparatus 1 by a subject distance estimation technique using image processing. The identification code is added or the volume of the sound data is adjusted according to the distance between the person A and the imaging apparatus 1 and the distance between the person B and the imaging apparatus 1. For example, for volume adjustment of the sound data, in a case where the distance between the person A and the imaging apparatus 1 is larger than a threshold value γ, the volume of the first sound data is decreased.

Figure 12A:
FIGS. 12A and 12B are diagrams explaining a specific example.
Figure 12B:

FIGS. 12A and 12B are diagrams explaining a specific example of the present example.

In a case illustrated in FIG. 12A, the person A is located within the threshold value γ. In this case, the first detection unit 102B detects that the person A is located within the threshold value γ, and volume adjustment for increasing the volume of the first sound data as the sound data of the person A is performed. On the other hand, in a case illustrated in FIG. 12B, the person A is located farther than the threshold value γ. In this case, the first detection unit 102B detects that the person A is located farther than the threshold value γ, and volume adjustment for decreasing the volume of the first sound data as the sound data of the person A is performed.

As described above, in the present example, the distance between the subject and the imaging apparatus 1 is detected, and volume adjustment is efficiently performed based on the distance between the subject and the imaging apparatus 1.

Modification Example 4

Next, a modification example 4 will be described. In the modification example 4, an identification code is added or volume adjustment of the sound data is performed according to whether or not the subject exists within an angle of view of the imaging apparatus 1.

In the present example, the first detection unit 102B recognizes whether or not each subject exists within the angle of view of the imaging apparatus 1 in the moving image data by image processing. For example, the first detection unit 102B recognizes whether or not the person A and the person B exist within the angle of view of the imaging apparatus 1 by using an image recognition technique. The identification code is added or the volume of the sound data is adjusted according to whether or not the person A and the person B exist within the angle of view. For example, in volume adjustment of the sound data, in a case where the person A appears within the angle of view of the imaging apparatus 1, the volume of the first sound data is increased, and in a case where the person A does not appear within the angle of view of the imaging apparatus 1, the volume of the first sound data is decreased.

In a case where an angle of view of the moving image data which is imaged by the imaging apparatus 1 and an angle of view of the moving image data which is actually stored in the storage unit 18 are different, for example, as in JP2017-46355A, the angle of view of the imaging apparatus 1 is the angle of view of the moving image data which is stored in the storage unit 18.

Figure 13:
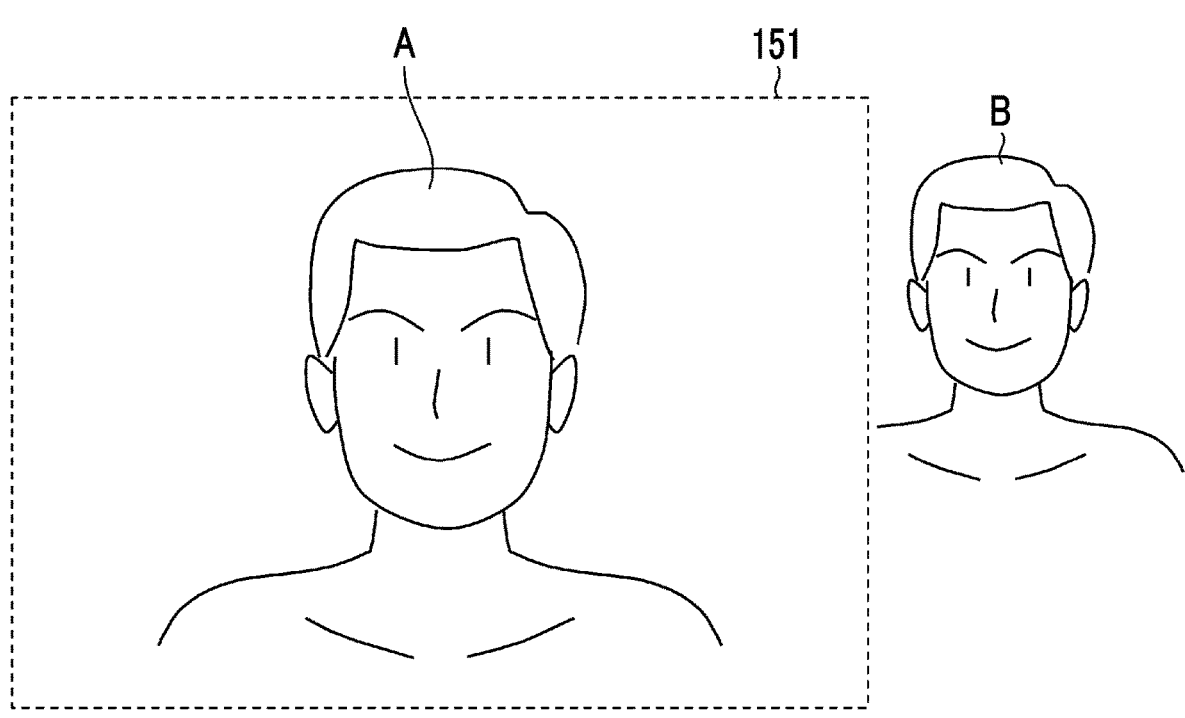
FIG. 13 is a diagram explaining a specific example.

FIG. 13 is a diagram explaining a specific example of the present example.

In a case illustrated in FIG. 13, the person A is located within the angle of view 151 of the imaging apparatus 1, and the person B is located outside the angle of view 151 of the imaging apparatus 1. In this case, the first detection unit 102B detects that the person A is located within the angle of view 151, and volume adjustment for increasing the volume of the first sound data as the sound data of the person A is performed. On the other hand, the first detection unit 102B detects that the person B is not located within the angle of view 151, and volume adjustment for decreasing the volume of the second sound data as the sound data of the person B is performed.

As described above, in the present example, the first detection unit 102B detects whether or not the subject exists within the angle of view of the imaging apparatus 1, and volume adjustment is efficiently performed according to whether or not the subject exists within the angle of view.

Modification Example 5

In the present example, the imaging apparatus 1 or the first microphone 12 and the second microphone 14 record sound data with a stereo sound. The stereo sound includes a sound for a human left ear and a sound for a human right ear. The first detection unit 102B recognizes whether the subject exists on a left side or exists on a right side with respect to a center of the imaging apparatus 1 in the moving image data by image processing, and an identification code is added or the volume of the sound data is adjusted. For example, for volume adjustment of the sound data, in a case where the person exists on a left side of the imaging apparatus 1, the volume of the sound data for a left ear is relatively increased. As a method for recognizing a position of the person, for example, a method using an image recognition technique or a method using GPS as in the modification example 1 may be used.

Figure 14A:
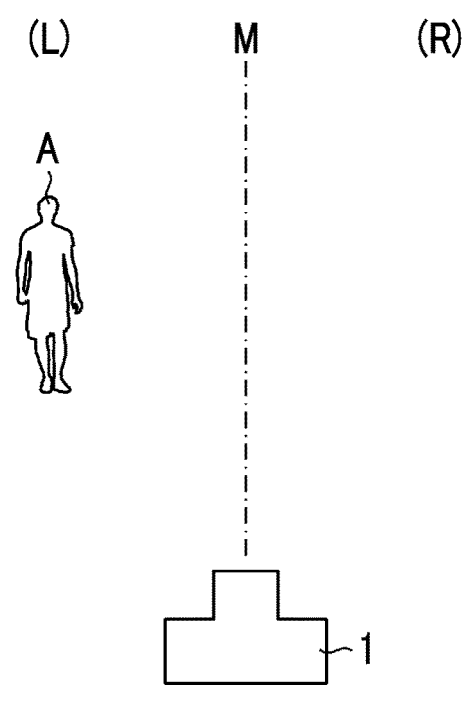
FIGS. 14A and 14B are diagrams explaining a specific example.
Figure 14B:
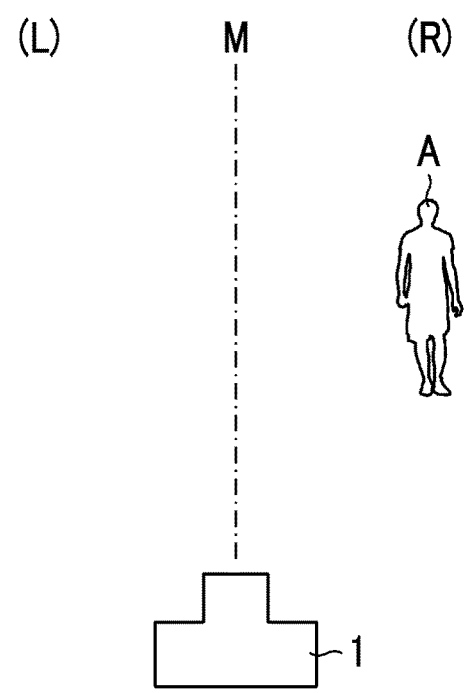

FIGS. 14A and 14B are diagrams explaining a specific example of the present example.

In a case illustrated in FIG. 14A, the person A is located on a L side with respect to an optical axis M of the imaging apparatus 1. In this case, the first detection unit 102B detects that the person A is located on the L side, and the volume of the sound data for a left ear is relatively increased in the first sound data as the sound data of the person A. On the other hand, in a case illustrated in FIG. 14B, the person A is located on a R side with respect to an optical axis M of the imaging apparatus 1. In this case, the first detection unit 102B detects that the person A is located on the R side, and the volume of the sound data for a right ear is relatively increased in the first sound data as the sound data of the person A.

As described above, in the present example, the first detection unit 102B detects a side on which the subject exists with respect to the imaging apparatus 1, and by making a difference in the volume of the sound data for a left ear and the volume of the sound data for a right ear, the moving image data with the sound having a larger realistic effect is obtained.

The first microphone 12 and the second microphone 14 may be a mobile phone or a smart phone. In this case, preferably, the mobile phone or the smart phone includes an application program for wirelessly connecting the phone and the imaging apparatus 1.

As described above, the embodiments and the examples according to the present invention have been described. On the other hand, the present invention is not limited to the embodiments, and various modifications may be made without departing from the spirit of the present invention.

EXPLANATION OF REFERENCES

1: imaging apparatus
10: imaging unit

10A: imaging optical system
10B: imaging element
10C: image signal processing unit
12: first microphone
12A: first sound signal processing unit
12B: first wireless communication unit
12C: first position detection system
14: second microphone
14B: second wireless communication unit
14C: second position detection system
16: display unit
18: storage unit
20: sound output unit
22: operation unit
24: CPU
26: ROM
28: RAM
30: third wireless communication unit
100: camera system
101: imaging control unit
102: image processing unit
102A: association unit
102B: first detection unit
102C: addition unit
102D: recording unit
104: first sound recording unit
106: second sound recording unit
112: second detection unit
A: person
B: person

What is claimed is:

1. A data creation method used in a camera system including an imaging apparatus and a plurality of microphones connected to the imaging apparatus, the method comprising:

an association step of associating the microphone with each subject possessing each of the microphones;

a recording step of recording moving image data using the imaging apparatus;

a sound recording step of recording sound data of each subject using each of the microphones in synchronization with a start of the recording step, a detection step of automatically detecting, by image processing, a state of the subject during the recording step; and an addition step of adding, to the moving image data, an identification code for volume adjustment of the sound data of each subject based on a result of the detection step, wherein the identification code is displayed with the moving image data displayed on a display unit.

2. The data creation method according to claim 1, wherein in the detection step, a state where the subject is speaking in the moving image data is recognized by image processing, and in the addition step, the identification code for relatively increasing a volume of the sound data of the subject that is speaking with respect to a volume of the sound data of another subject is added to the moving image data.

3. The data creation method according to claim 2, wherein in the detection step, a distance between each subject and the imaging apparatus in the moving image data is recognized by image processing, and in the addition step, the identification code for adjusting the volume of the sound data is added to the moving image data according to the distance of each subject.

4. The data creation method according to claim 2, wherein in the detection step, whether or not each subject exists within an angle of view of the imaging apparatus in the moving image data is recognized by image processing, and in the addition step, the identification code for adjusting the volume of the sound data is added to the moving image data according to whether or not the subject exists within the angle of view of the imaging apparatus.

5. The data creation method according to claim 2, further comprising:

a position acquisition step of obtaining a position of each of a plurality of subjects from a position detection system that is possessed by each of the plurality of subjects, wherein in the detection step, the position of each of the plurality of subjects that is obtained by the position acquisition step is detected, and in the addition step, the identification code for volume adjustment of the sound data of each subject is added to the moving image data based on a result of the detection step.

6. The data creation method according to claim 1, wherein in the detection step, a direction in which each subject is facing in the moving image data is recognized by image processing, and in the addition step, the identification code for adjusting the volume of the sound data is added to the moving image data according to a direction of a face of each subject with respect to the imaging apparatus.

7. The data creation method according to claim 6, wherein in the detection step, a distance between each subject and the imaging apparatus in the moving image data is recognized by image processing, and in the addition step, the identification code for adjusting the volume of the sound data is added to the moving image data according to the distance of each subject.

8. The data creation method according to claim 6, wherein in the detection step, whether or not each subject exists within an angle of view of the imaging apparatus in the moving image data is recognized by image processing, and in the addition step, the identification code for adjusting the volume of the sound data is added to the moving image data according to whether or not the subject exists within the angle of view of the imaging apparatus.

9. The data creation method according to claim 1, wherein in the detection step, a distance between each subject and the imaging apparatus in the moving image data is recognized by image processing, and in the addition step, the identification code for adjusting the volume of the sound data is added to the moving image data according to the distance of each subject.

10. The data creation method according to claim 9, wherein in the detection step, whether or not each subject exists within an angle of view of the imaging apparatus in the moving image data is recognized by image processing, and in the addition step, the identification code for adjusting the volume of the sound data is added to the moving image data according to whether or not the subject exists within the angle of view of the imaging apparatus.

11. The data creation method according to claim 1, wherein in the detection step, whether or not each subject exists within an angle of view of the imaging apparatus in the moving image data is recognized by image processing, and in the addition step, the identification code for adjusting the volume of the sound data is added to the moving image data according to whether or not the subject exists within the angle of view of the imaging apparatus.

12. The data creation method according to claim 1, further comprising:

a position acquisition step of obtaining a position of each of a plurality of subjects from a position detection system that is possessed by each of the plurality of subjects, wherein in the detection step, the position of each of the plurality of subjects that is obtained by the position acquisition step is detected, and in the addition step, the identification code for volume adjustment of the sound data of each subject is added to the moving image data based on a result of the detection step.

13. The data creation method according to claim 1, further comprising:

a reception step of receiving volume adjustment of the sound data by a user after the addition step.

14. A non-transitory computer readable recording medium which records therein, a computer command that causes a computer to execute the data creation method according to claim 1 in a case where the computer command is read by the computer.

15. A data creation method used in a camera system including an imaging apparatus, and a plurality of microphones which are provided outside the imaging apparatus and connected to the imaging apparatus, the method comprising:

an association step of associating the microphone with each subject possessing each of the microphones;

a recording step of recording moving image data using the imaging apparatus;

a sound recording step of recording sound data of each subject using each of the microphones in synchronization with a start of the recording step;

a detection step of automatically detecting, by image processing, a state of the subject during the recording step;

a synthesis step of synthesizing the sound data and the moving image data; and an adjustment step of automatically adjusting a volume of the sound data of each subject based on a result of the detection step, before or after the synthesis step, wherein in the detection step, a state where the subject is speaking in the moving image data is recognized by image processing, and in the adjustment step, a volume of the sound data of a subject that is not speaking is relatively decreased with respect to a volume of the sound data of another subject, wherein the identification code is displayed with the moving image data displayed on a display unit.

16. The data creation method according to claim 15, wherein in the detection step, a direction in which each subject is facing in the moving image data is recognized by image processing, and in the adjustment step, the volume of the sound data is adjusted according to a direction of a face of each subject with respect to the imaging apparatus.

17. The data creation method according to claim 15, wherein in the detection step, a distance between each subject and the imaging apparatus in the moving image data is recognized by image processing, and in the adjustment step, the volume of the sound data is adjusted according to the distance of each subject.

18. The data creation method according to claim 15, wherein in the detection step, whether or not each subject exists within an angle of view of the imaging apparatus in the moving image data is recognized by image processing, and in the adjustment step, the volume of the sound data is adjusted according to whether or not the subject exists within the angle of view of the imaging apparatus.

19. The data creation method according to claim 15, further comprising:

a position acquisition step of obtaining a position of each of a plurality of subjects from a position detection system that is possessed by each of the plurality of subjects, wherein, in the adjustment step, the volume of the sound data of each subject is adjusted based on a result of the position acquisition step and a result of the detection step.

20. A non-transitory computer readable recording medium which records therein, a computer command that causes a computer to execute the data creation method according to claim 15 in a case where the computer command is read by the computer.

* * * * *